(12) United States Patent
Kiribuchi (10) Patent No.: US 12,237,673 B2
(45) Date of Patent: Feb. 25, 2025

(54) POWER SUPPLY SYSTEM AND POWER SUPPLY UNIT

(71) Applicant: OMRON Corporation, Kyoto (JP)

(72) Inventor: Takeshi Kiribuchi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 59 days.

(21) Appl. No.: 18/250,313

(22) PCT Filed: Mar. 9, 2021

(86) PCT No.: PCT/JP2021/009184
§ 371 (c)(1),
(2) Date: Apr. 24, 2023

(87) PCT Pub. No.: WO2022/097311
PCT Pub. Date: May 12, 2022

(65) Prior Publication Data
US 2023/0402840 A1    Dec. 14, 2023

(30) Foreign Application Priority Data

Nov. 9, 2020 (JP) .................................. 2020-186776

(51) Int. Cl.
*H02J 3/38* (2006.01)
*H02J 1/12* (2006.01)
*H02J 3/32* (2006.01)

(52) U.S. Cl.
CPC .................. *H02J 1/12* (2013.01); *H02J 3/32* (2013.01); *H02J 3/38* (2013.01)

(58) Field of Classification Search
CPC .................. H02J 1/12; H02J 3/32; H02J 3/38

USPC .......................................................... 307/31
See application file for complete search history.

(56) References Cited

U.S. PATENT DOCUMENTS

| 7,737,577 | B2 * | 6/2010 | Langlois | H02J 3/38 |
| | | | | 307/19 |
| 8,901,774 | B2 * | 12/2014 | Yan | H02M 3/157 |
| | | | | 307/31 |
| 10,916,947 | B2 * | 2/2021 | Shen | H02J 3/38 |
| 12,077,052 | B2 * | 9/2024 | Mosebach | B64D 11/00 |

(Continued)

FOREIGN PATENT DOCUMENTS

| JP | 2009027870 A | 2/2009 |
| JP | 2014128102 A | 7/2014 |

(Continued)

OTHER PUBLICATIONS

International Search Report issued in Intl. Appln. No. PCT/JP2021/009184 mailed May 18, 2021. English translation provided.

(Continued)

*Primary Examiner* — Michael R. Fin
(74) *Attorney, Agent, or Firm* — ROSSI, KIMMS & McDOWELL LLP (57) ABSTRACT

A power supply system is installable in a predetermined apparatus to receive power supply from an external power system. The power supply system includes a first power supply path in the predetermined apparatus, and a first power converter that receives power input from the external power system, converts the power to first power, and outputs the first power to the first power supply path.

13 Claims, 7 Drawing Sheets

(56) References Cited

U.S. PATENT DOCUMENTS

2015/0188315 A1\* 7/2015 Hytten .................... H02J 3/36
                                                    307/18
2017/0317503 A1   11/2017 Ohashi et al.
2018/0212549 A1\* 7/2018 Yoshida ................. H02M 1/32
2019/0319459 A1\* 10/2019 Brathwaite .............. H02J 3/38

FOREIGN PATENT DOCUMENTS

JP     2017200307 A    11/2017
WO     2020195552 A1   10/2020

OTHER PUBLICATIONS

Written Opinion issued in Intl. Appln. No. PCT/JP2021/009184 mailed May 18, 2021. English translation provided.

\* cited by examiner

POWER SUPPLY SYSTEM AND POWER SUPPLY UNIT

FIELD

The present invention relates to a power supply system in an apparatus that receives power from an external power system, and a power supply unit for the power supply system.

BACKGROUND

Inverter devices supply power to load devices driven by alternating current (AC) power. The inverter devices are power supply devices for converting direct current (DC) power received and for supplying AC power converted as appropriate for the driving. Patent Literature 1 and Patent Literature 2 describe known techniques for a power supply system that includes inverter devices and supplies power to drive load devices. Patent Literature 1 describes a power supply system in which load devices driven by commercial power are also assisted with power generated from natural energy. Patent Literature 2 describes a system in which power stored in batteries is converted by a DC-DC converter and supplied to inverters.

CITATION LIST

Patent Literature

Patent Literature 1: Japanese Unexamined Patent Application Publication No. 2014-128102
Patent Literature 2: Patent Literature 1: Japanese Unexamined Patent Application Publication No. 2009-27870

SUMMARY

Technical Problem

Apparatuses such as machine tools and conveyors installed at factories and other facilities include load devices such as servo motors. The apparatuses also similarly include power supply devices such as inverter devices to control driving of the load devices. Numerous apparatuses are typically installed at factories or other facilities and include many drive shafts. Thus, numerous load devices are to receive drive currents and undergo drive control. This complicates the operations for wiring for supplying the power.

The apparatuses are controlled and driven to deliver operations intended by users and thus have various internal power supply specifications designed based on user requests. For example, intended power specifications are different in individual apparatuses depending on their installation sites or the details of operation. Thus, an apparatus that appropriately satisfies requests from a user is to satisfy power supply specifications based on the requests and may be more costly.

In response to this issue, one or more aspects of the present invention are directed to a technique for providing power supply to appropriately satisfy user requests in an apparatus including multiple load devices.

Solution to Problem

In response to the above issue, one or more aspects of the present invention are directed to an apparatus including multiple load devices in which a first power converter controls power conversion between an external power system and an internal component in the apparatus, and adjusts power to have an appropriate voltage and outputs the power to a first power supply path in the apparatus. This structure allows appropriate operations in accordance with various requests from a user associated with power supply. Power conversion herein refers to changing one or more parameters of power transferred for electric energy use in an electric system. The parameter is a variable for characterizing the form of power, such as a voltage, a current, a frequency (including a direct current as a zero frequency), a phase, or the number of phases. The power conversion also includes converting one of various power forms including, in addition to alternating current (AC) and direct current (DC), a square wave and a triangular wave to another form of power.

More specifically, a power supply system according to an aspect of the present invention is installable in a predetermined apparatus to receive power supply from an external power system. The power supply system includes a first power supply path that supplies power to a plurality of load devices in the predetermined apparatus, and a first power converter that receives power input from the external power system, converts the power to first power, and outputs the first power to the first power supply path. The first power converter may be, for example, a DC-DC converter, an AC-DC converter, or an AC-AC converter. The first power converter converts power received from an external source to first power and outputs the first power to the first power supply path. The first power converter can convert the received power, and can, for example, increase, decrease, or increase and decrease the voltage characterizing the power. The output first power flows through the first power supply path and into multiple load devices included in the apparatus. The first power converter may receive input power with a predetermined first parameter characterizing a form of power in the external power system, and the predetermined first parameter may have a first variation range. Examples of the first parameter may be a voltage, a current, a frequency (including a direct current as a zero frequency), a phase, or the number of phases. The first parameter is set as appropriate with the common technical knowledge of those skilled in the art. The first variation range is set as appropriate based on, for example, a variation range of the parameter, such as a voltage, that characterizes the form of power in the external power system. This structure allows power flowing through the first power supply path in the power supply system to be a form of power as intended by the user.

The above power supply system may further include a second power converter connected to the first power supply path to convert the first power to second power and output the second power, a load power supply path separate from the first power supply path to receive the output second power, and a plurality of power supply devices connected to the load power supply path to receive input of the second power, convert the second power to load power, and supply the load power to each of the plurality of load devices. The apparatus including the power supply system includes the multiple load devices driven by the multiple power supply devices. The multiple load devices that are driven by load power output from the power supply devices may be in any form. For example, an AC-driven servo motor may be an example of the load devices. In this case, an example of the power supply devices may be an inverter device. In some embodiments, heaters or other devices may be examples of the load devices. In this case, an example of the power supply devices may be a switch for switching on and off. Examples of the apparatus may be a machine tool or a conveyor including a servo motor or a heater. The apparatus receives power supply from the external power system to drive the load devices. For example, the apparatus may be connected to at least one of a DC power system or an AC power system installed in a relatively wide area such as at a factory.

The second power converter is a converter that can supply appropriate power in accordance with the specifications of the power supply devices. For example, the second power converter may be a DC-DC converter, an AC-DC converter, or an AC-AC converter. The second power converter converts the first power to second power and outputs the second power to the load power supply path. The second power converter can convert the first power, and can, for example, increase, decrease, or increase and decrease the voltage characterizing the first power. The power conversion capability of the second power converter may be the same as or different from that of the first power converter. The load power supply path, to which the second power converter outputs the second power, is separate from the first power supply path and carries the second power to each of the multiple power supply devices as power for driving the load devices. The second power converter may receive input power with a predetermined second parameter characterizing a form of power in the first power supply path, and the predetermined second parameter may have a second variation range. Examples of the second parameter may be a voltage, a current, a frequency (including a direct current as a zero frequency), a phase, or the number of phases. The second parameter is set as appropriate with the common technical knowledge of those skilled in the art. The second variation range may be set as appropriate based on, for example, a variation range of the parameter described above, such as a voltage, characterizing the form of power in the first power supply path.

With this structure, the first power supply path and the load power supply path included in the power supply system, each in cooperation with the first power converter and the second power converter, can appropriately adjust the form of power to be supplied in accordance with user requests. When apparatuses installed at different places are to receive power in different forms from the power system, the apparatus including the power supply system according to one or more aspects of the present invention can operate appropriately on a different form of received power.

When the first power converter adjusts the first power at a relatively high voltage, the first power supply path is to carry a lower current. The first power supply path can thus be formed using a thinner power cable. This reduces the operations for wiring in the apparatus. When a voltage on the first power supply path is not appropriate for driving the load devices, the second power converter may convert the voltage and output an appropriate voltage as the second voltage to the load power supply path.

In the power supply system described above, the external power system may be a direct current power system to supply direct current power. The first power converter may receive direct current power input from the external power system, convert the direct current power to the first power, and output the first power being direct current power to the first power supply path. The second power converter may convert the first power to the second power and output the second power being direct current power to the load power supply path. In some embodiments, the external power system may be an AC power system carrying AC power. The first power converter receiving AC power from the power system may convert the AC power to first power being DC power and output the first power to the first power supply path.

The power supply system described above may further include a power supply unit including the second power converter, the load power supply path, and the plurality of power supply devices. The plurality of power supply devices may be connected to the load power supply path in a predetermined relationship. The unitized second power converter, multiple power supply devices, and components between them can be handled more easily. Unitizing the devices and components is more effective for the power supply system including more power supply devices. The power supply system including the first power converter can reduce inrush currents. Thus, the power supply unit may not include components for preventing inrush currents to the corresponding multiple power supply devices. The power flowing through the load power supply path in the power supply unit may be DC power, AC power, or power in other forms.

When the above plurality of power supply devices are inverter devices, and when a first load device of the plurality of load devices corresponding to one of the plurality of power supply devices operates regeneratively and generates regenerative power, the regenerative power may be consumed, through the load power supply path, by a second load device other than the first load device performing power running. This structure allows the power supply unit to consume the regenerative power internally, thus avoiding affecting the first power supply path external to the unit.

The above power supply system may include a plurality of the power supply units. When the apparatus includes more load devices and corresponding power supply devices, connecting the multiple power supply units with the first power supply path allows the power supply system to supply power appropriate for the respective load devices easily.

When the above power supply system includes a plurality of the power supply units, the second power converter in each of the plurality of power supply units may be connected to one another in a daisy chain with the first power supply path. With this structure, all the power supply devices included in the power supply system are connected in a unified manner that can easily be managed. This can reduce an overcurrent due to the inductance or the capacitance of the first power supply path or the load power supply path appropriately in advance.

When the above power supply system includes a plurality of the power supply units and the plurality of power supply devices are inverter devices, and when, in a first power supply unit of the plurality of power supply units, a first load device of the plurality of load devices corresponding to one of the plurality of power supply devices in the first power supply unit operates regeneratively and generates regenerative power, the regenerative power may be consumed, through the first power supply path, by a second power supply unit of the plurality of power supply units. With this structure, the regenerative power can be consumed within the apparatus and is less likely to affect the external DC power system. When the above regenerative power generated in the first power supply unit causes a predetermined second parameter characterizing a form of power in the first power supply path to exceed a first threshold, the first power converter may release the regenerative power to the external power system.

The power supply system described above may further include a unit abnormality detector that detects abnormality associated with power supply in the power supply unit based on power converted by the second power converter and power converted by the plurality of power supply devices. In the power supply unit without abnormality, the power converted by the second power converter theoretically matches the power converted by the multiple power supply devices. The unit abnormality detector can detect abnormality based on this. For the power supply system carrying DC power, calculation of power for abnormality detection can be performed in a relatively short period of time. This allows rapid detection of any abnormality.

The power supply system described above may further include an apparatus abnormality detector that detects abnormality associated with power supply in the predetermined apparatus based on power converted by the first power converter and power converted by the plurality of power supply devices, or based on power converted by the first power converter and power converted by the second power converter. In the apparatus without abnormality, the power converted by the first power converter theoretically matches the sum of power converted by the multiple power supply devices or the power converted by the second power converter. The apparatus abnormality detector can detect abnormality based on this. For the power supply system carrying DC power, calculation of power for abnormality detection can be performed in a relatively short period of time. This allows rapid detection of any abnormality.

In the power supply system described above, the external power system may be connected to another apparatus other than the predetermined apparatus to supply power to the other apparatus. In this case, when regenerative power generated in the other apparatus is released to the external power system and causes a predetermined first parameter characterizing a form of power in the external power system to exceed a second threshold, power conversion through the first power converter in the predetermined apparatus may be performed for predetermined power consumption processing in the predetermined apparatus. This structure can appropriately prevent, for example, an overvoltage in the power system and maintain safety in the power supply.

One or more aspects of the present invention may be directed to a power supply unit for a power supply system installable in a predetermined apparatus to receive power supply from an external direct current power system. The predetermined apparatus includes a plurality of load devices. The power supply unit receives input direct current power, converts the input direct current power to load power, and supplies the load power to each of the plurality of load devices. For example, the power supply unit includes a power converter that receives the input direct current power, converts the direct current power to predetermined direct current power, and outputs the predetermined direct current power, a load power supply path that receives the output predetermined direct current power, and a plurality of power supply devices connected to the load power supply path. The plurality of power supply devices receive input of the predetermined direct current power, convert the predetermined direct current power to load power, and supply the load power to each of the plurality of load devices. The plurality of power supply devices are connected to the load power supply path in a predetermined relationship.

In the above power supply unit in the power supply system, direct current power from the direct current power system may be input into a first power converter, converted by the first power converter, and input into the power supply unit as a first direct current power.

Advantageous Effects

The technique provides power supply to appropriately satisfy user requests in an apparatus including multiple load devices.

DETAILED DESCRIPTION

Example Use

Figure 1:
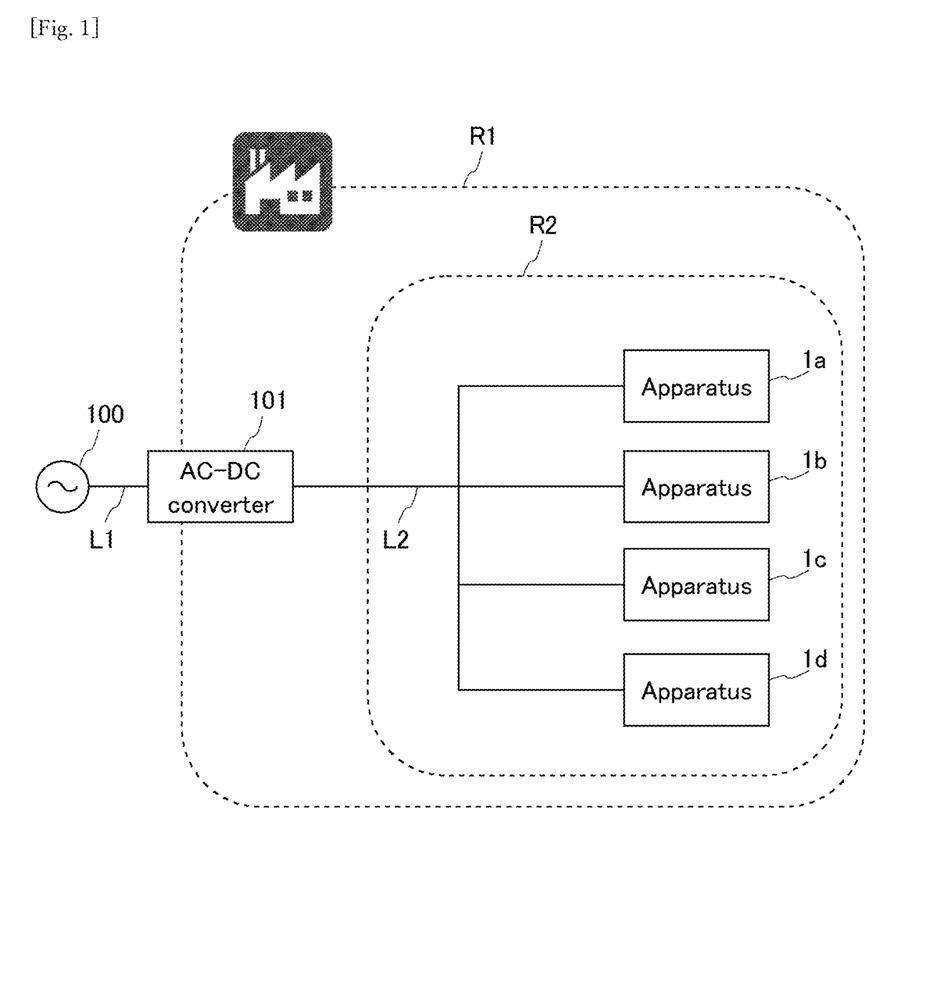
FIG. 1 is a schematic diagram of a power system installed at a factory.

An example use of a power supply system according to one or more embodiments of the present disclosure will now be described with reference to the drawings. FIG. 1 is a schematic diagram of a power system installed at a factory. In FIG. 1, R1 indicates a factory site area. The area R1 includes numerous apparatuses 1. Individual apparatuses are identified with identification signs (e.g., a, b, c and d) added to follow the reference numeral 1 as shown in FIG. 1. When not being specifically identified, the apparatuses are represented with the reference numeral 1 alone. Each of the apparatuses 1 is designed to include motors 14 shown in FIG. 2 as load devices to perform predetermined tasks (e.g., processing or conveyance) at the factory. Examples of the apparatus 1 may be various machines (e.g., arms of industrial robots or conveyors). Each motor 14 is incorporated in the apparatus 1 as a load device to drive the apparatus 1. The motor 14 is, for example, an alternating current (AC) servo motor. The motor 14 is attached to an encoder. The encoder feeds back a parameter signal about the operation of the motor 14 to a servo driver (including an inverter device 13 described below). The parameter signal (hereafter, a feedback signal) transmitted as feedback includes, for example, position information about the rotational position (angle) of the rotational shaft of the motor 14 or information about the rotational speed of the rotational shaft.

The servo driver receives, in addition to a motion command signal associated with an operation (motion) of the motor 14 from a programmable logic controller (PLC) (not shown) through a network in the apparatus 1, a feedback signal output from the encoder connected to the motor 14. In response to the motion command signal from the PLC and the feedback signal from the encoder, the servo driver calculates servo control associated with driving of the motor 14, or in other words, a command value associated with the motion of the motor 14. At the same time, the servo driver controls the inverter device 13 and supplies a drive current to the motor 14 to cause the motor 14 to operate in accordance with the command value. The inverter device 13 corresponds to the power supply device in an aspect of the present disclosure.

Power supply in the apparatus 1 will now be described in relation to drive currents supplied to the motors 14. An external AC power source 100 supplies AC power to the factory site area R1 through a power system L1. The supplied AC power is converted to direct current (DC) power by an AC-DC converter 101 and is output to a DC power system L2 in the site area R1. For the power system, R2 indicates the area to which the DC power system L2 supplies DC power. The multiple apparatuses 1 can receive DC power supply from the common DC power system L2 in the area R2. The factory site area R1 also includes an AC power system (not shown) using AC power supplied from the external AC power source 100. Each apparatus 1 includes devices (e.g., PLCs described above) operable on AC power. These devices receive AC power from the AC power system.

Figure 2:
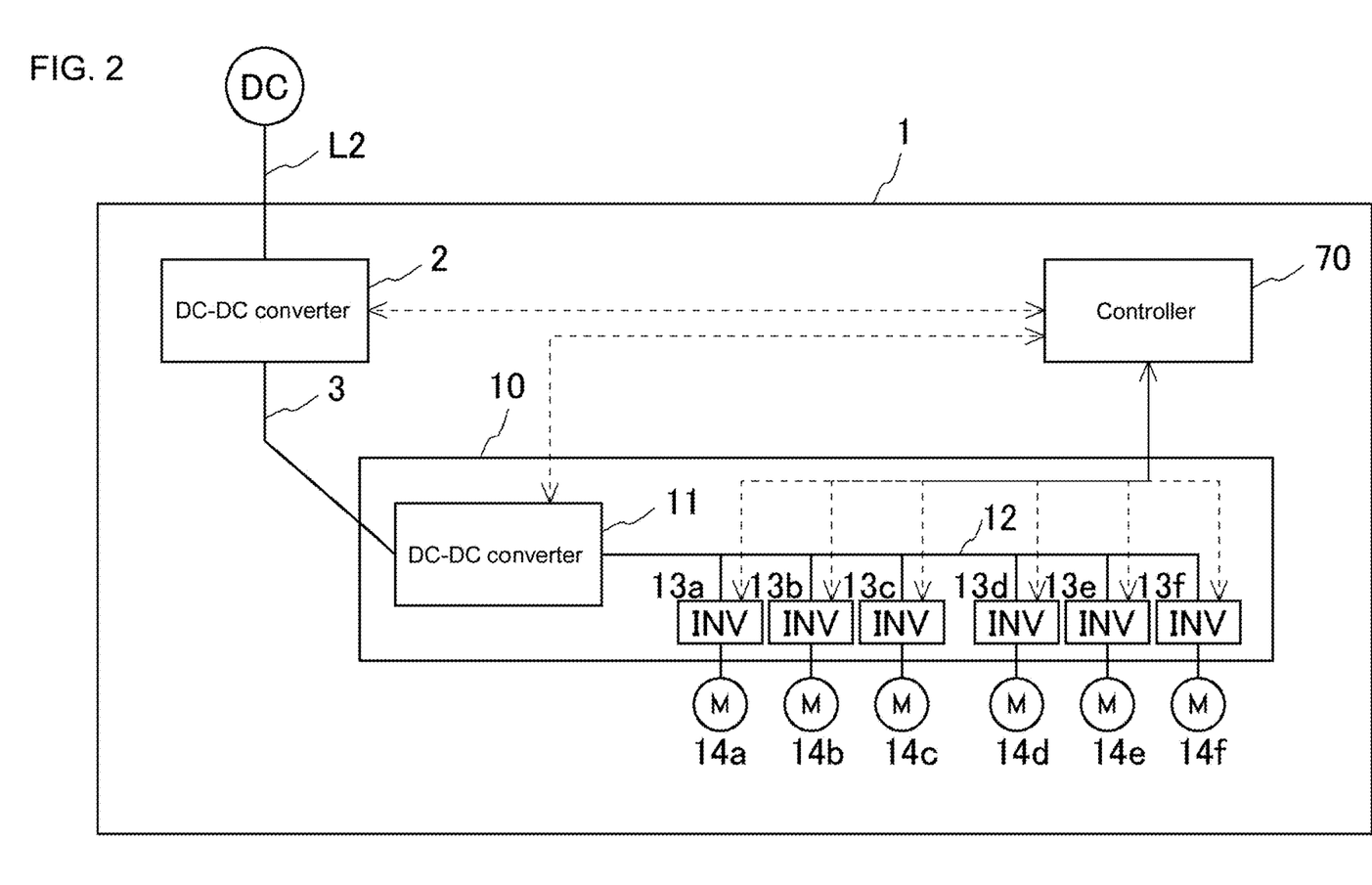
FIG. 2 is a first schematic diagram of power supply components in an apparatus.

A DC power supply path in the apparatus 1 will now be described with reference to FIG. 2. The DC power is supplied to the inverter devices 13 for generating drive currents for the motors 14. As described above, the apparatus 1 receives DC power supply from the DC power system L2 located in the factory area R2. The supplied DC power is input into a DC-DC converter 2 and is converted to a predetermined DC voltage. For example, the DC power system L2 may input a DC voltage of 1000 V, which may be converted by the DC-DC converter 2 to a DC voltage of 200 V or 400 V. The resulting DC power is output to a first power supply path 3 in the apparatus 1. The DC-DC converter 2 includes, for example, a breaker and a noise filter that are commonly used. The DC-DC converter 2 further includes a capacitor to reduce voltage changes in the first power supply path 3.

The apparatus 1 includes multiple motors 14 as load devices. Individual motors are identified with identification signs (e.g., a, b, and c) added to follow the reference numeral 14 as shown in FIG. 2. When not being identified, the motors are represented with the reference numeral 14 alone. In the structure shown in FIG. 2, six motors 14a to 14f are mounted on the apparatus 1. Each motor is an AC motor. The apparatus 1 includes the inverter devices 13 incorporated to correspond to the motors. Similarly to the motors 14, the inverter devices 13 are identified with identification numerals (e.g., a, b, and c) added to follow the reference numeral 13. The six motors 14 thus correspond to six inverter devices 13.

In one or more embodiments of the present disclosure, the six inverter devices 13, the single DC-DC converter 11, and a load power supply path 12 connecting an output portion of the DC-DC converter 11 and the respective inverter devices 13 are combined into a single power supply unit 10. The power supply unit 10 includes the load power supply path 12 and the six inverter devices 13 connected in a relationship in which each inverter device 13 receives power directly from the load power supply path 12 as shown in FIG. 2. The load power supply path 12 is connected to the output portion of the DC-DC converter 11. The DC-DC converter 11 includes an input portion connected to the first power supply path 3. The first power supply path 3 carries DC power, which is converted by the DC-DC converter 11 to a predetermined DC voltage and is output to the load power supply path 12. The DC voltage on the load power supply path 12 is an appropriate voltage for driving the inverter devices 13. The DC-DC converter 11 includes, for example, a breaker and a noise filter that are commonly used. The DC-DC converter 11 further includes a capacitor to reduce voltage changes on the load power supply path 12.

The apparatus 1 includes a controller 70. The controller 70 includes a processor such as a microcontroller or a central processing unit (CPU) and peripheral circuits of the processor. The controller 70 is electrically connected to the DC-DC converter 2 and the DC-DC converter 11. The controller 70 transmits or receives information about the respective converters and controls voltage changes caused by the converters. The controller 70 may be included in the PLC described above. In some embodiments, the controller 70 may be included in a control device with a structure different from the structure of the PLC. The controller 70 is electrically connected to the respective inverter devices 13 and transmits or receives information about the inverter devices 13. The controller 70 is electrically connected to a sensor (not shown) for detecting the voltage on the first power supply path 3 and a sensor (not shown) for detecting the voltage on the load power supply path 12, and can detect these voltages separately. The controller 70 is connected to and can communicate with other apparatuses 1 different from the apparatus 1 including the controller 70. Thus, the apparatuses 1 can transmit or receive information to and from one another.

In the apparatus 1 including the components described above, the DC-DC converter 2 can adjust the DC voltage on the first power supply path 3 to a voltage intended by the user. Particularly, when the DC-DC converter 2 adjusts the DC voltage on the first power supply path 3 to a relatively higher voltage, a smaller current flows through the first power supply path 3. The first power supply path 3 may thus be formed using a thinner power cable. This reduces the operations for wiring in the apparatus 1. This is particularly effective for the apparatus 1 with an elongated first power supply path 3. When the first power supply path 3 carries a DC voltage inappropriate for driving the motors 14, the DC-DC converter 11 may transform the voltage to an appropriate voltage and adjust the DC voltage on the load power supply path 12. The DC-DC converter 2 may function when a DC voltage with a first variation range is applied from the DC power system L2. The DC-DC converter 2 being responsive to such input variations can function appropriately in response to voltage variations in the AC power source 100 or output variations in the AC-DC converter 101. Identical apparatuses 1 installed at places to receive different voltages from an external DC power system can operate appropriately. In other words, the apparatuses 1 may be installed at any places, increasing user convenience.

Further, the DC-DC converter 11 can adjust the DC voltage on the load power supply path 12 to a voltage intended by the user. This structure may stabilize power supply for driving the inverter devices 13. The DC-DC converter 11 may receive a DC voltage with a second variation range from the first power supply path 3. The structure responsive to input variations can maintain stable power supply.

The DC-DC converter 11 and the inverter devices 13, including the load power supply path 12, are unitized as the power supply unit 10. The unitized DC-DC converter 11, inverter devices 13, and components between them can be handled more easily. Particularly, as shown in FIG. 2, more (six) inverter devices use more power cables to connect the inverter devices 13 and the DC-DC converter 11. Unitizing these components substantially simplifies the operations for power supply wiring in the apparatus 1. This effectively reduces the operations for wiring and minimizes errors in the wiring operations.

The power supply unit 10 including the DC-DC converter 11 can adjust DC voltage on the load power supply path 12 in the unit to a voltage as intended. For example, when the load power supply path 12 is to carry a relatively higher DC voltage, the load power supply path 12 may be formed using a thinner power cable. When the load power supply path 12 is to carry a relatively lower DC voltage, for example, devices and electrical components relevant to power supply may have a lower voltage withstand performance and thus be smaller. In the apparatus 1 shown in FIG. 2, the DC-DC converter 2 is located between the DC power system L2 and the power supply unit 10. Thus, the power supply unit 10 may not include components for preventing inrush currents to the corresponding inverter devices 13.

First Modification

Figure 3:
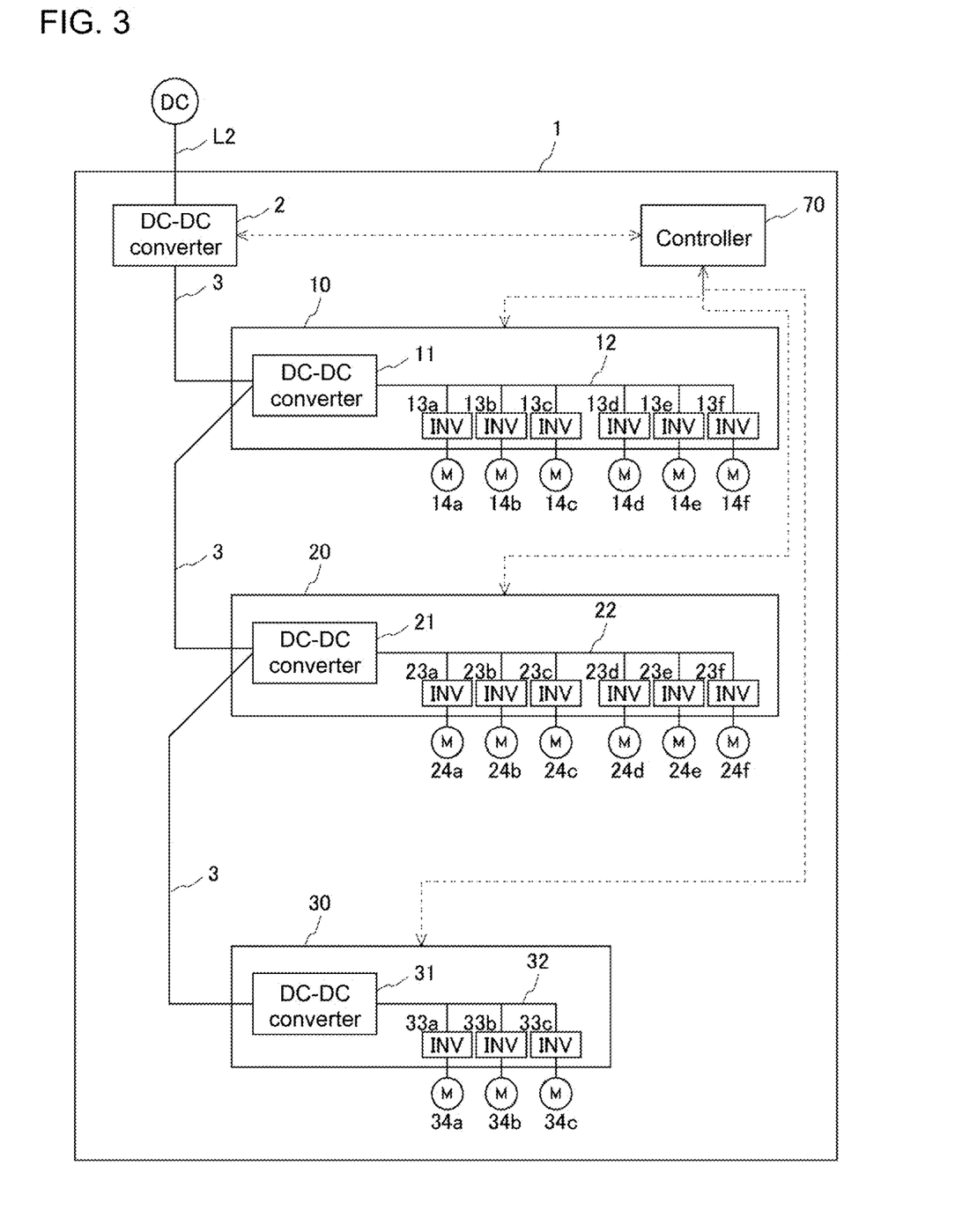
FIG. 3 is a second schematic diagram of power supply components in the apparatus.

The DC power supply path in the apparatus 1 in a modification will now be described with reference to FIG. 3. In FIG. 3, the apparatus 1 includes a total of fifteen motors 14, 24, and 34. The respective motors allow the apparatus 1 to perform an intended operation. The fifteen motors 14, 24, and 34 include six motors 14a to 14f that receive load power from the power supply unit 10, six motors 24a to 24f that receive load power from a power supply unit 20, and three motors 34a to 34c that receive load power from a power supply unit 30. The power supply unit 10 in FIG. 3 is identical to the power supply unit 10 in FIG. 2. The power supply unit 20 is substantially identical to the power supply unit 10. The power supply unit 20 includes a DC-DC converter 21, a load power supply path 22, and six inverter devices 23 corresponding to the six motors 24. The power supply unit 30 includes a DC-DC converter 31, a load power supply path 32, and three inverter devices 23 corresponding to the three motors 34. In the apparatus 1, the DC-DC converters 11, 21, and 31 included in the respective power supply units are connected in a daisy chain in this order with the first power supply path 3.

The apparatus 1 in FIG. 3 also includes the controller 70. The controller 70 is electrically connected to the DC-DC converter 2 and the respective power supply units. The controller 70 controls, for example, the DC-DC converters and associated information transmission and reception, transmits and receives information about the respective inverter devices, and detects voltages on the respective supply paths.

Multiple power supply units in the apparatus 1 are connected into a DC power supply path as described above to simplify the formation of the DC power supply path when many motors 14, 24, and 34 and the corresponding inverter devices 13, 23, and 33 are included. As described above, with the DC-DC converter 2 adjusting the DC voltage on the first power supply path 3 to a relatively higher voltage, the first power supply path 3 connecting the multiple power supply units may be formed using a thinner power cable. This further simplifies the formation of the DC power supply path. When connected freely, the inverter devices on the DC power supply path in the apparatus 1 can be connected in various forms as intended by the user. This may cause an unexpected overcurrent from the inductance or the capacitance of the first power supply path or the load power supply path. However, the power supply units connected in a daisy chain as described above allows the inverter devices in the apparatus 1 to be connected in a unified manner that can easily be managed and can reduce an overcurrent appropriately in advance.

Second Modification

Figure 4:
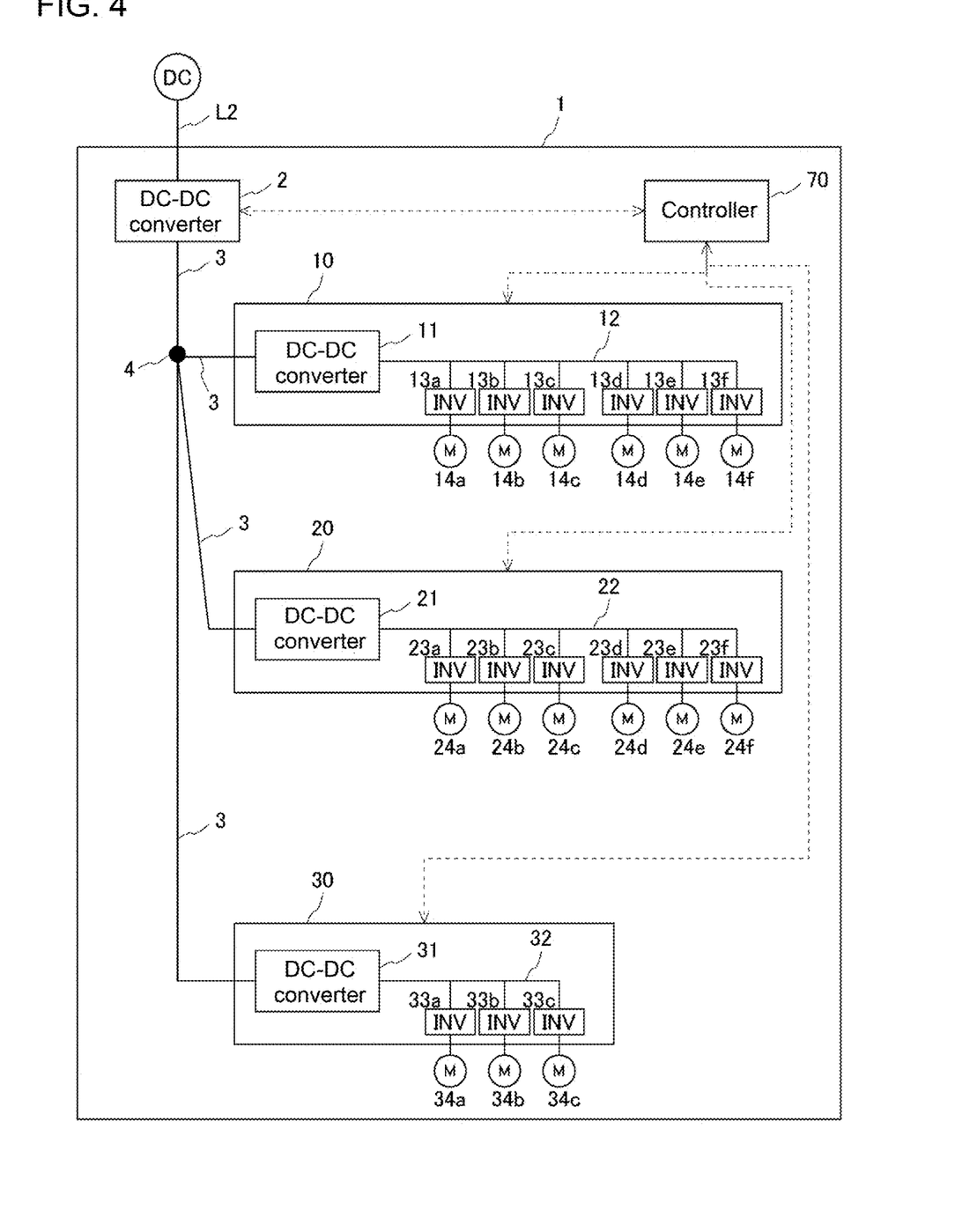
FIG. 4 is a third schematic diagram of power supply components in the apparatus.

For the apparatus 1 including multiple power supply units, the DC power supply path in the apparatus 1 in another modification will be described with reference to FIG. 4. The structure shown in FIG. 4 is different from the structure shown in FIG. 3 in the form of connection of the DC-DC converters 11, 21, and 31 in the power supply units. More specifically, in the apparatus 1 shown in FIG. 4, the first power supply path 3 connected to the DC-DC converter 2 branches at a connector 4 and extends toward each of the power supply units 10, 20, and 30. The structure shown in FIG. 4 including many motors 14, 24, and 34 and the corresponding inverter devices 13, 23, and 33 can simplify the formation of the DC power supply path. With the first power supply path 3 carrying a higher voltage, the first power supply path 3 may be formed using a thinner power cable.

Third Modification

In the structures shown in FIGS. 1 to 4, AC power supplied from the power system L1 is converted to DC power with a predetermined voltage by the AC-DC converter 101 and supplied to the DC power system L2. In some embodiments, the power system L2 may receive AC power. In this case, another converter device may replace the AC-DC converter 101 and perform conversion, or may allow AC power from the power system L1 to flow into the power system L2 without conversion. This structure may use an AC-DC converter as a power converter device corresponding to the DC-DC converter 2 in the apparatus 1. The AC-DC converter outputs DC power, which is supplied to, for example, the DC-DC converter 11 in the power supply unit 10 and serves as load power for driving the motors connected to the units. In some embodiments, the apparatus 1 may include two power systems, one receiving AC power as the power system L2 and the other receiving DC power. In this case, power converters corresponding to the respective systems are incorporated as appropriate.

The load devices included in the apparatus 1 may be devices (e.g., heaters) driven by DC power, instead of the motors 14. In this case, the power supply unit 10 includes, instead of the inverter devices 13, on-off switches for controlling power supply to the heaters as power supply devices. More specifically, the power supply unit 10 is to include the load power supply path 12 connected to six on-off switches each connected to the heater. In some embodiments, the apparatus 1 including multiple power supply units, as shown in FIGS. 3 and 4, may include different power supply units corresponding to multiple types of load devices. For example, some power supply units may supply power to motors, and the others may supply power to heaters. When the different types of load devices operate on DC power with different specifications, the DC-DC converters in the power supply units can form a power supply environment appropriate for driving the load devices. Thus, a common power supply path (first power supply path 3) can connect the power supply units.

Power Supply Control 1

Figure 5:
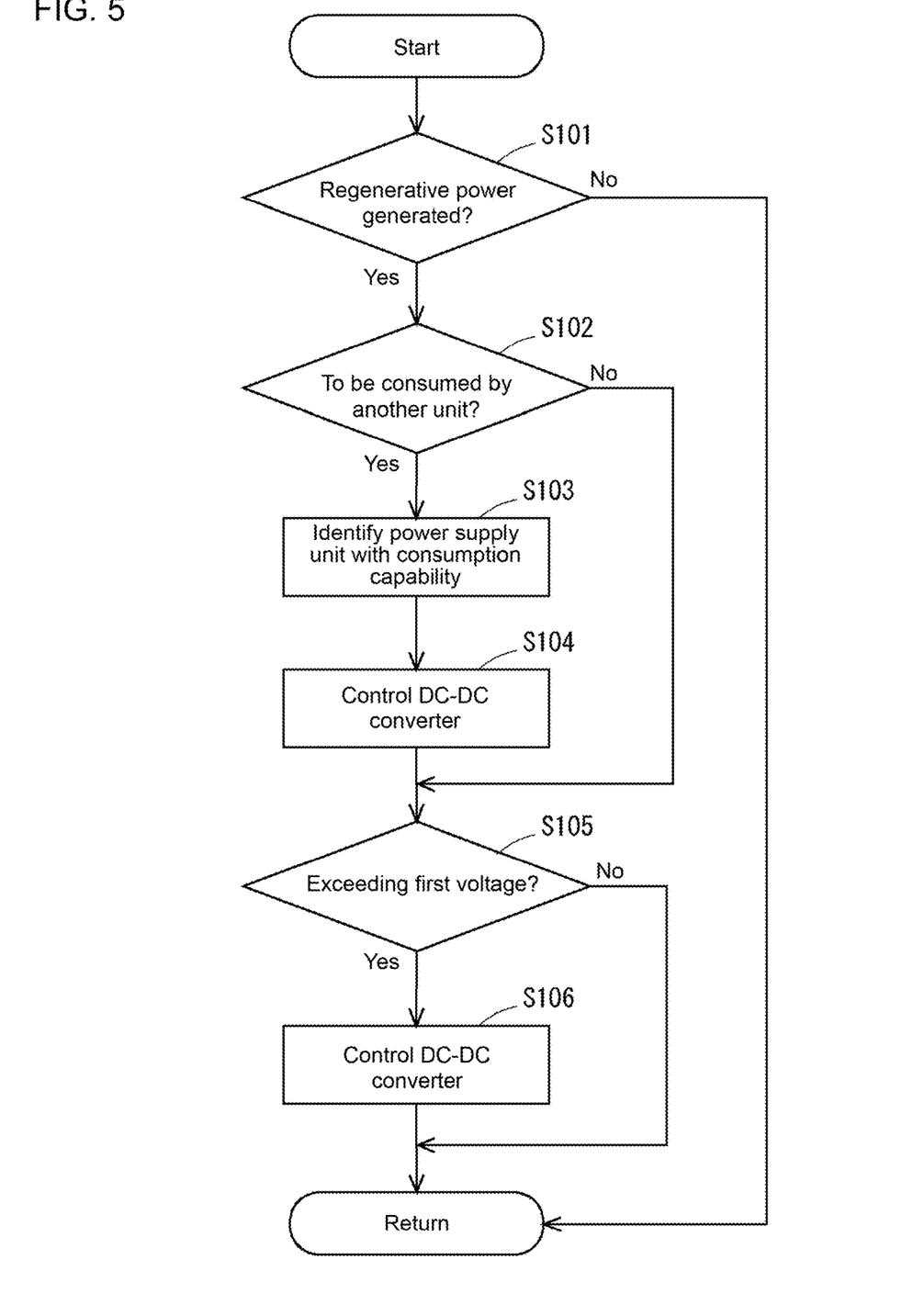
FIG. 5 is a first flowchart of a control process for DC-DC converters performed in the apparatus in response to generation of regenerative power.

For the apparatus 1 including multiple power supply units as shown in FIGS. 3 and 4, control associated with power supply will be described with reference to FIG. 5. The power supply control shown in FIG. 5 is performed by the controller 70 repeatedly executing a predetermined program at predetermined intervals. In S101, the determination is performed as to whether any power supply unit generates regenerative power. The motors can be determined to be accelerating or decelerating based on, for example, commands from servo drivers (not shown). An approximate amount of regenerative power to be generated can also be determined. The determination in S101 may be affirmative based on the degree of effect to the first power supply path 3 in the apparatus 1 when the regenerative power exceeds a predetermined amount. Regenerative power varies in accordance with the load inertia and the rotational speed of movable shafts. Thus, some regenerative operations may not affect the first power supply path 3. In response to an affirmative determination result in S101, the processing advances to S102. In response to a negative determination result in S101, the control process ends.

The processing in S102 is performed to determine, for the power supply unit generating regenerative power in S101, whether the regenerative power is to be consumed by another power supply unit. When a motor in a power supply unit generates regenerative power, the regenerative power may be consumed by the other motors performing power running through the load power supply path. The determination in S102 may be performed based on such consumption of the regenerative power. For example, when the motor 14a operating in the power supply unit 10 generates regenerative power and the other motors 14b to 14f performing power running in the same power supply unit 10 can consume the regenerative power, the regenerative power is determined not to be consumed by another power supply unit in S102. When the operations of the other motors 14b to 14f cannot consume the regenerative power sufficiently and the DC voltage on the load power supply path 12 increases and exceeds a predetermined reference value, the regenerative power is determined to be consumed by another power supply unit in S102. When the power supply units each include a regenerative resistor for consuming regenerative power and regenerative power exceeding the consumption capability of the regenerative resistor causes the DC voltage on the load power supply path 12 to increase and exceed the predetermined reference value, the regenerative power is determined to be consumed by another power supply unit in S102. The processing advances to S103 in response to an affirmative determination result in S102, and advances to S105 in response to a negative determination result in S102.

In response to an affirmative determination result in S102, the processing in S103 is performed to identify a power supply unit that can consume the excess regenerative power. Such a unit can be identified from the power supply units generating no regenerative power based on the remaining power consumption capability of their regenerative resistors. Subsequently, the processing in S104 is performed to control power conversion processing in DC-DC converters involved in transferring power from the power supply unit generating the regenerative power to the power supply unit identified in S103 through the first power supply path 3. For example, when regenerative power from the power supply unit 10 is consumed in the power supply unit 20, the DC-DC converter 11 and the DC-DC converter 21 are controlled. After the processing is complete in S104, the processing advances to S105.

The processing in S105 is performed to determine whether the first power supply path 3 carries a DC voltage higher than a predetermined first voltage (corresponding to a first threshold in an aspect of the present disclosure). The predetermined first voltage is set based on electrical safety concern in the apparatus 1 or other factors. The processing in S105 and subsequent steps is performed based on the possibility of an excess increase in the DC voltage on the first power supply path 3, independently of power consumption in the power supply units generating no regenerative power. In response to an affirmative determination result in S105, the DC-DC converter 2 is controlled in S106, and DC power in the first power supply path 3 is released to the DC power system L2 external to the apparatus 1. This may lower the DC voltage on the first power supply path 3.

As described above, the control process shown in FIG. 5 processes regenerative power generated in the apparatus 1 appropriately and reduces power to be released to the DC power system L2, thus increasing safety in both the apparatus 1 and the DC power system L2.

Power Supply Control 2

Figure 6:
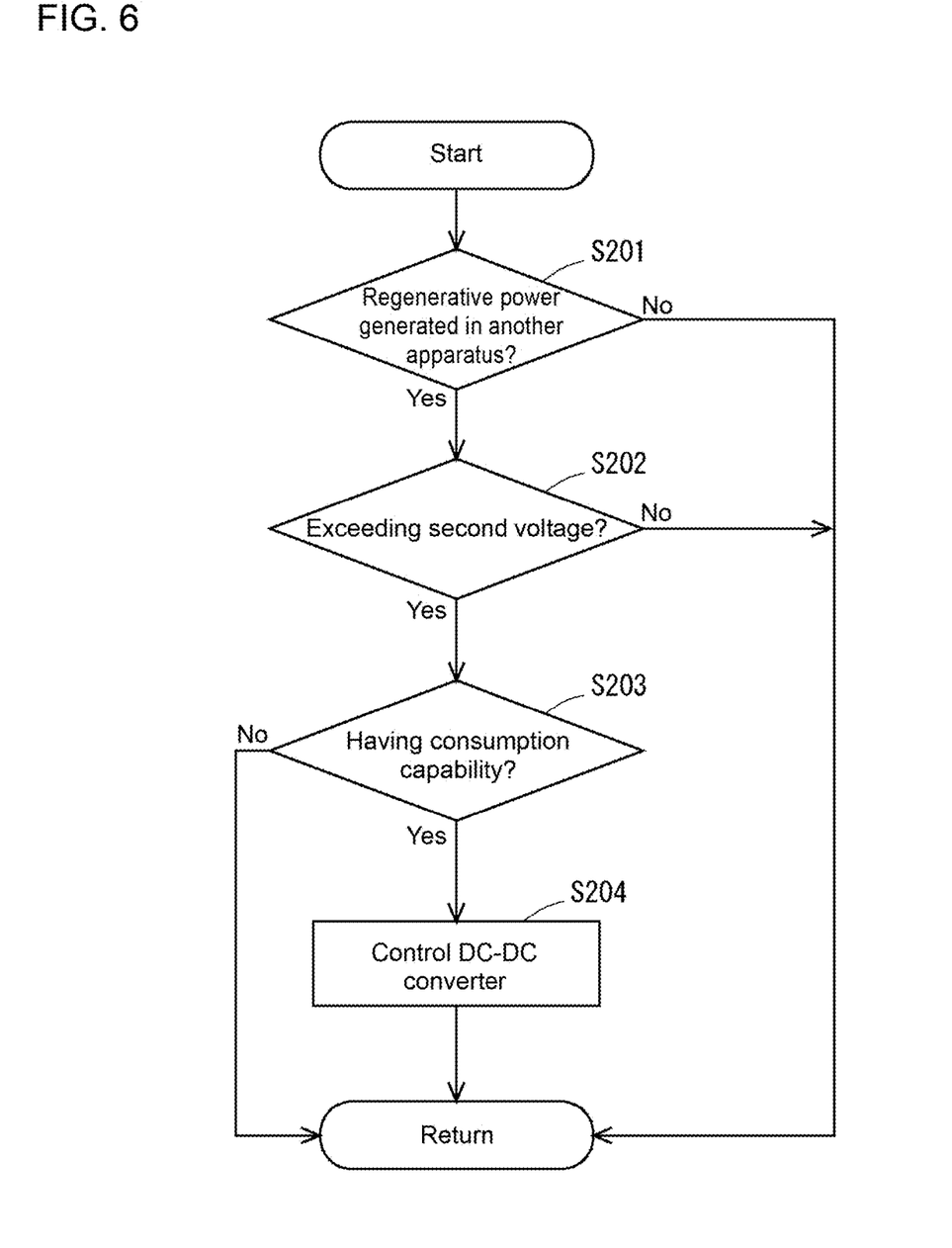
FIG. 6 is a second flowchart of a control process for a DC-DC converter performed in the apparatus in response to generation of regenerative power.

For the DC power system L2 connected to the multiple apparatuses 1 as shown in FIG. 1, a control process associated with power supply will be described with reference to FIG. 6. The power supply control shown in FIG. 6 is performed by the controller 70 repeatedly executing a predetermined program at predetermined intervals. As described above, the controllers 70 each included in the apparatus 1 can communicate with one another and can obtain information about power supply in other apparatuses 1 from the other apparatuses 1.

The processing in S201 is first performed to determine whether regenerative power is generated in another apparatus 1 different from a predetermined apparatus 1 that performs the control process. The generation of regenerative power can be determined based on, for example, the details of motor operation in the entire apparatuses 1. In response to an affirmative determination result in S201, the processing advances to S202. The processing in S202 is performed to determine whether the DC power system L2 carries a DC voltage higher than a predetermined second voltage (corresponding to a second threshold in an aspect of the present disclosure). The determination process can respond to a possible increase in the DC voltage on the DC power system L2 when regenerative power generated by the other apparatus 1 is insufficiently consumed by the other apparatus 1 and is released to the DC power system L2. The predetermined second voltage is set based on electrical safety concern in the DC power system L2 or other factors. In response to an affirmative determination result in S202, the processing advances to S203.

The processing in S203 is performed to determine whether the predetermined apparatus 1 can consume the excess regenerative power. The determination can be performed based on, for example, the remaining power consumption capability of regenerative resistors in the power supply units included in the predetermined apparatus 1. In response to an affirmative determination result in S203, the processing advances to S204. In S204, the DC-DC converter 2 in the predetermined apparatus 1 is controlled to allow DC power in the DC power system L2 to flow into the predetermined apparatus 1. The incoming power is consumed by the regenerative resistors described above. This may lower the DC voltage on the DC power system L2.

In response to a negative determination result in S203, the control process ends. When none of the apparatuses 1 including the predetermined apparatus 1 can consume the regenerative power, the DC power system L2 is to carry a higher DC voltage that may involve safety concern. In this case, the AC-DC converter 101 may be controlled to release power from the DC power system L2 to the external power system L1.

Abnormality Detection Control

Figure 7:
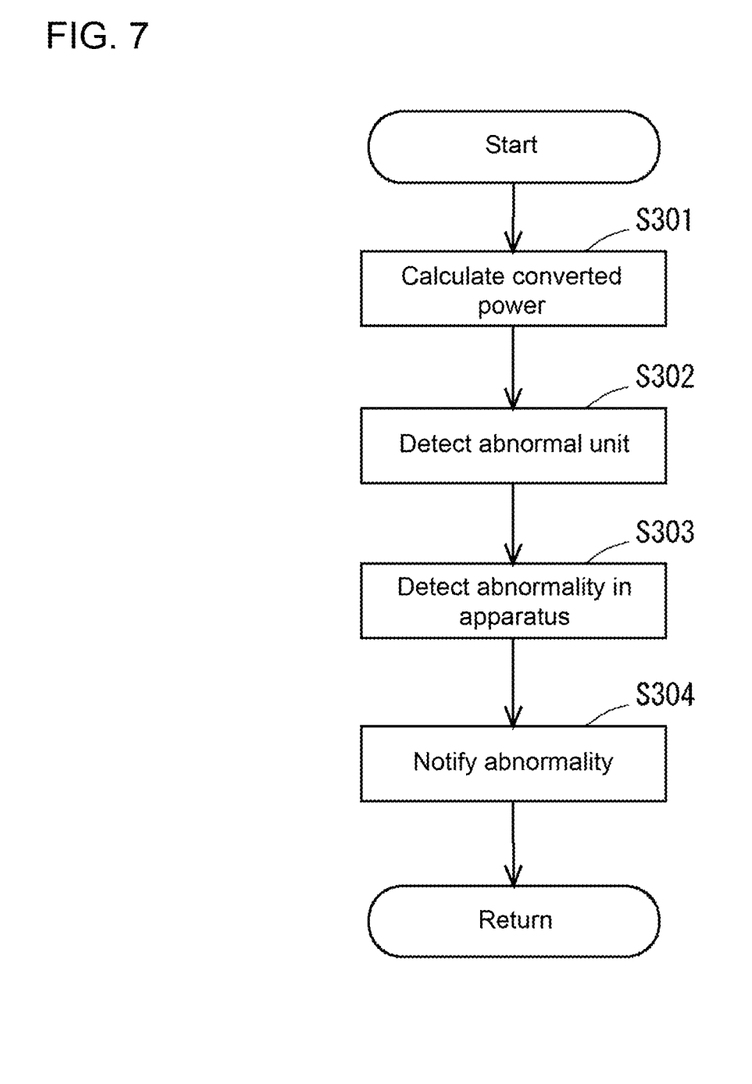
FIG. 7 is a flowchart of control associated with abnormality detection performed in the apparatus.

For the apparatus 1 including power supply units as described above, a control process associated with abnormality detection during power supply will be described with reference to FIG. 7. The abnormality detection control process shown in FIG. 7 is performed by the controller 70 repeatedly executing a predetermined program at predetermined intervals.

In S301, the apparatus 1 first calculates the power converted by the DC-DC converter 2 and the power converted by each of the DC-DC converter 11, 21, and 31 and the inverter devices 13, 23, and 33 in the power supply units 10, 20, and 30.

In S302, each power supply unit undergoes abnormality detection process based on the converted power calculated in S301. In the power supply unit 10, for example, when the difference between the power converted by the DC-DC converter 11 and the total power converted by the inverter devices 13a to 13f is greater than a predetermined threshold, the power supply unit can be determined to include a supply path with power loss (abnormality). The other power supply units 20 and 30 may undergo the same or similar determination.

In S303, abnormality associated with power supply in the apparatus 1 is detected based on the converted power calculated in S301. For example, when the difference between the power converted by the DC-DC converter 2 and the total power converted by the power supply units 10, 20, and 30 (in other words, the total power converted by the inverter devices 13, 23, and 33) is greater than a predetermined threshold, the apparatus 1 can be determined to include a supply path with power loss (abnormality). In some embodiments, the apparatus 1 may be determined to include a supply path with power loss (abnormality) when the difference between the power converted by the DC-DC converter 2 and the total power converted by the DC-DC converters 11, 21, and 31 in the power supply units 10, 20, and 30 is greater than a predetermined threshold.

When abnormality associated with the power supply units or the apparatus 1 is detected in S302 or S303, the user receives a notification of the abnormality in S304. The notification of the abnormality may be provided to an information processing device (e.g., a computer or a mobile terminal) used by the user. The apparatus 1 includes the DC power system L2, the first power supply path 3, and the load power supply path 12 each carrying DC power. Thus, calculating the power converted during a relatively short period of time can provide sufficient information for performing the abnormality detection described above. This greatly contributes to prompt abnormality detection.

Appendix 1

A power supply system installable in a predetermined apparatus (1) to receive power supply from an external power system (L2), the power supply system comprising:
a first power supply path (3) configured to supply power to a plurality of load devices in the predetermined apparatus (1); and
a first power converter (2) configured to receive power input from the external power system (L2), convert the power to first power, and output the first power to the first power supply path (3).

Appendix 2

A power supply unit (10) for a power supply system installable in a predetermined apparatus (1) to receive power supply from an external direct current power system (L2), the predetermined apparatus including a plurality of load devices (14), the power supply unit (10) being for receiving input direct current power, converting the input direct current power to load power, and supplying the load power to each of the plurality of load devices (14), the power supply unit (10) comprising:

a power converter (11) configured to receive the input direct current power, convert the direct current power to predetermined direct current power, and output the predetermined direct current power;
a load power supply path (12) configured to receive the output predetermined direct current power; and
a plurality of power supply devices (13) connected to the load power supply path (12), the plurality of power supply devices being configured to receive input of the predetermined direct current power, convert the predetermined direct current power to load power, and supply the load power to each of the plurality of load devices (14),
wherein the plurality of power supply devices (13) are connected to the load power supply path (12) in a predetermined relationship.

DESCRIPTION OF SYMBOLS 1 apparatus
2 DC-DC converter
3 first power supply path
10, 20, 30 power supply unit
11, 21, 31 DC-DC converter
12, 22, 32 load power supply path
13, 23, 33 inverter device
14, 24, 34 motor
70 controller

The invention claimed is:
1. A power supply system installable in a predetermined apparatus to receive power supply from an external power system, the power supply system comprising:
a first power supply path configured to supply power to a plurality of load devices in the predetermined apparatus;
a first power converter configured to receive power input from the external power system, convert the power to first power, and output the first power to the first power supply path;
a second power converter connected to the first power supply path, the second power converter being configured to convert the first power to second power and output the second power;
a load power supply path separate from the first power supply path, the load power supply path being configured to receive the output second power;
a plurality of power supply devices connected to the load power supply path, the plurality of power supply devices being configured to receive input of the second power, convert the second power to load power, and supply the load power to each of the plurality of load devices; and
a power supply unit including the second power converter, the load power supply path, and the plurality of power supply devices,
wherein the power supply unit is configured to unitize the second power converter, the load power supply path, and the plurality of power supply devices so that the plurality of power supply devices are connected to the load power supply path in a predetermined relationship.
2. The power supply system according to claim 1, wherein the external power system is a direct current power system to supply direct current power,
the first power converter receives direct current power input from the external power system, converts the direct current power to the first power, and outputs the first power being direct current power to the first power supply path, and the second power converter converts the first power to the second power and outputs the second power being direct current power to the load power supply path.

3. The power supply system according to claim 1, wherein the first power converter receives input power with a predetermined first parameter characterizing a form of power in the external power system, and the predetermined first parameter has a first variation range.

4. The power supply system according to claim 1, wherein the second power converter receives input power with a predetermined second parameter characterizing a form of power in the first power supply path, and the predetermined second parameter has a second variation range.

5. The power supply system according to claim 1, wherein the plurality of power supply devices are inverter devices, and when a first load device of the plurality of load devices corresponding to one of the plurality of power supply devices operates regeneratively and generates regenerative power, the regenerative power is consumed, through the load power supply path, by a second load device other than the first load device performing power running.

6. The power supply system according to claim 1, wherein the power supply system includes a plurality of the power supply units, and the second power converter in each of the plurality of power supply units is connected to one another in a daisy chain with the first power supply path.

7. The power supply system according to claim 1, wherein the power supply system includes a plurality of the power supply units, the plurality of power supply devices are inverter devices, and when, in a first power supply unit of the plurality of power supply units, a first load device of the plurality of load devices corresponding to one of the plurality of power supply devices in the first power supply unit operates regeneratively and generates regenerative power, the regenerative power is consumed, through the first power supply path, by a second power supply unit of the plurality of power supply units.

8. The power supply system according to claim 7, wherein when the regenerative power generated in the first power supply unit causes a predetermined second parameter characterizing a form of power in the first power supply path to exceed a first threshold, the first power converter releases the regenerative power to the external power system.

9. The power supply system according to claim 1, further comprising:

a unit abnormality detector configured to detect abnormality associated with power supply in the power supply unit based on power converted by the second power converter and power converted by the plurality of power supply devices.

10. The power supply system according to claim 1, further comprising:

an apparatus abnormality detector configured to detect abnormality associated with power supply in the predetermined apparatus based on power converted by the first power converter and power converted by the plurality of power supply devices, or based on power converted by the first power converter and power converted by the second power converter.

11. The power supply system according to claim 2, wherein the external power system is connected to another apparatus other than the predetermined apparatus to supply power to the other apparatus, and when regenerative power generated in the other apparatus is released to the external power system and causes a predetermined first parameter characterizing a form of power in the external power system to exceed a second threshold, power conversion through the first power converter in the predetermined apparatus is performed for predetermined power consumption processing in the predetermined apparatus.

12. A power supply unit for a power supply system installable in a predetermined apparatus to receive power supply from an external direct current power system, the predetermined apparatus including a plurality of load devices, the power supply unit being for receiving input direct current power, converting the input direct current power to load power, and supplying the load power to each of the plurality of load devices, the power supply unit comprising:

a power converter configured to receive the input direct current power, convert the direct current power to predetermined direct current power, and output the predetermined direct current power;

a load power supply path configured to receive the output predetermined direct current power; and a plurality of power supply devices connected to the load power supply path, the plurality of power supply devices being configured to receive input of the predetermined direct current power, convert the predetermined direct current power to load power, and supply the load power to each of the plurality of load devices, wherein the power supply unit is configured to unitize the second power converter, the load power supply path, and the plurality of power supply devices so that the plurality of power supply devices are connected to the load power supply path in a predetermined relationship.

13. The power supply unit according to claim 12, wherein in the power supply system, direct current power from the direct current power system is input into a first power converter, converted by the first power converter, and input into the power supply unit as a first direct current power.

* * * * *